US011492864B2

(12) United States Patent
Andueza

(10) Patent No.: US 11,492,864 B2
(45) Date of Patent: Nov. 8, 2022

(54) CONNECTOR

(71) Applicant: FMC TECHNOLOGIES DO BRASIL LTDA, Rio de Janeiro (BR)

(72) Inventor: Alejandro Andueza, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 22 days.

(21) Appl. No.: 16/768,835

(22) PCT Filed: Nov. 12, 2018

(86) PCT No.: PCT/BR2018/050414
§ 371 (c)(1),
(2) Date: Jun. 1, 2020

(87) PCT Pub. No.: WO2019/104401
PCT Pub. Date: Jun. 6, 2019

(65) Prior Publication Data
US 2021/0164311 A1 Jun. 3, 2021

(30) Foreign Application Priority Data
Dec. 1, 2017 (BR) .......................... 102017025983-8

(51) Int. Cl.
*E21B 33/038* (2006.01)
(52) U.S. Cl.
CPC .................................. *E21B 33/038* (2013.01)
(58) Field of Classification Search
CPC .................................................... E21B 33/038

USPC ......................................................... 166/368
See application file for complete search history.

(56) References Cited

U.S. PATENT DOCUMENTS

| 4,615,544 A | | 10/1986 | Baugh | |
|---|---|---|---|---|
| 4,909,546 A | * | 3/1990 | Nobileau | E21B 33/0422 166/206 |
| 4,989,479 A | * | 2/1991 | Anderson | B25B 7/02 81/186 |
| 7,017,950 B2 | * | 3/2006 | Macaulay | E21B 17/042 285/333 |
| 7,380,607 B2 | * | 6/2008 | Thomas | E21B 33/038 166/208 |
| 7,614,453 B2 | * | 11/2009 | Spiering | E21B 33/038 166/338 |
| 2007/0176424 A1 | * | 8/2007 | Nobileau | F16L 15/007 285/382 |

(Continued)

OTHER PUBLICATIONS

International Search Report issued in corresponding International Application No. PCT/BR2018/050414; dated Mar. 22, 2019 (2 pages).

(Continued)

*Primary Examiner* — Matthew R Buck
*Assistant Examiner* — Patrick F Lambe
(74) *Attorney, Agent, or Firm* — Osha Bergman Watanabe & Burton LLP

(57) ABSTRACT

A connector includes a jaw used to connect a connection element and a wellhead designed to better distribute tensions on the contact surfaces of the teeth thereof, including, for example, having contact surfaces with differentiated angles and differentiated spacing, resulting evened tensions on the contact surfaces of the teeth.

11 Claims, 6 Drawing Sheets

(56) References Cited

U.S. PATENT DOCUMENTS

2018/0163902 A1* 6/2018 Manning ............... F16L 15/008

OTHER PUBLICATIONS

Written Opinion of the International Searching Authority issued in corresponding International Application No. PCT/BR2018/050414; dated Mar. 22, 2019 (3 pages).

* cited by examiner

CONNECTOR

FIELD OF THE INVENTION

The present invention relates to a wellhead connector having a teeth configuration that allows a more uniform tension distribution between male and female. Such a configuration consists of a jaw profile comprising a differentiated spacing among teeth and differentiated teeth angles (between male and female). The present invention can be used on contact surfaces, through which the preload of connectors of any type, from terrestrial to subsea connectors, passes.

BACKGROUND OF THE INVENTION

Connectors are used to connect two types of equipment, usually cylindrical parts, and apply a certain preload therebetween. Therefore, connectors are commonly used in the oil and gas field, for example, by connecting the wellhead to the BOP.

The connector is made up of multi-toothed jaws having a tooth profile that is used to apply a preload to the contact surface. Despite the male (connector jaw) and female (wellhead contact surface) have the same profile in order to be better engaged, the tension distribution, after material deformation, is not uniform. This fact is due to the stiffness difference of the components during the connector locking.

Document U.S. Pat. No. 7,614,453 discloses a connector having jaws with non-uniform spacings between the connector teeth and also the wellhead surface. Such a configuration allows to distribute tension and contact forces more uniformly between the contact surfaces.

The present invention proposes a more efficient distribution configuration of tensions and contact forces between the teeth surfaces, making the locking mechanism more resistant to failure.

BRIEF DESCRIPTION OF THE INVENTION

The connectors have the function to usually connect two cylindrical parts and apply a particular preload therebetween. For this purpose, each of the parts has a locking profile through which the load is transmitted to. These profiles always show angular locks, which influence the mechanical gain that is a characteristic of each type of connector. The parts that are connected can have profiles with a number of teeth ranging from one to four, but not limited to that number.

The load transfer angles used in the art are the same between male and female. Equal angles generate a non-uniform tension distribution on the contact surfaces due to the non-uniform stiffness distribution to the components.

The present invention discloses contact surfaces with differentiated angles and differentiated spacing which confer an extremely beneficial effect on the tension uniformity on the contact surfaces. The combination of angular differences and differentiated spacing of the teeth is an even more efficient solution.

The proposed invention has the advantage of making the distribution of tensions on the contact surfaces more uniform, directly impacting on the sizing and optimization of the connector project.

BRIEF DESCRIPTION OF THE FIGURES

The connector according to the present invention comprises jaws with differentiated spacings and differentiated angles between the jaw and the contact surface in order to reach the intended goals.

The present invention will be better understood from the accompanying illustrative drawings, which, in a schematic form and without limiting its scope, represent.

DETAILED DESCRIPTION OF THE INVENTION

The present invention relates to a connector comprising a jaw (26) having a configuration to better distribute tensions on the contact surfaces of the teeth, i.e., it has contact surfaces with differentiated angles and differentiated spacings, conferring an extremely beneficial effect on the tension uniformity on the contact surfaces, solving the problem regarding the non-uniformity of the tension distribution on the teeth contact surfaces, and of the connectors in general, since the stiffness distribution of these teeth is also not uniform as well as the stiffness distribution in the wellhead is not uniform.

Figure 1:
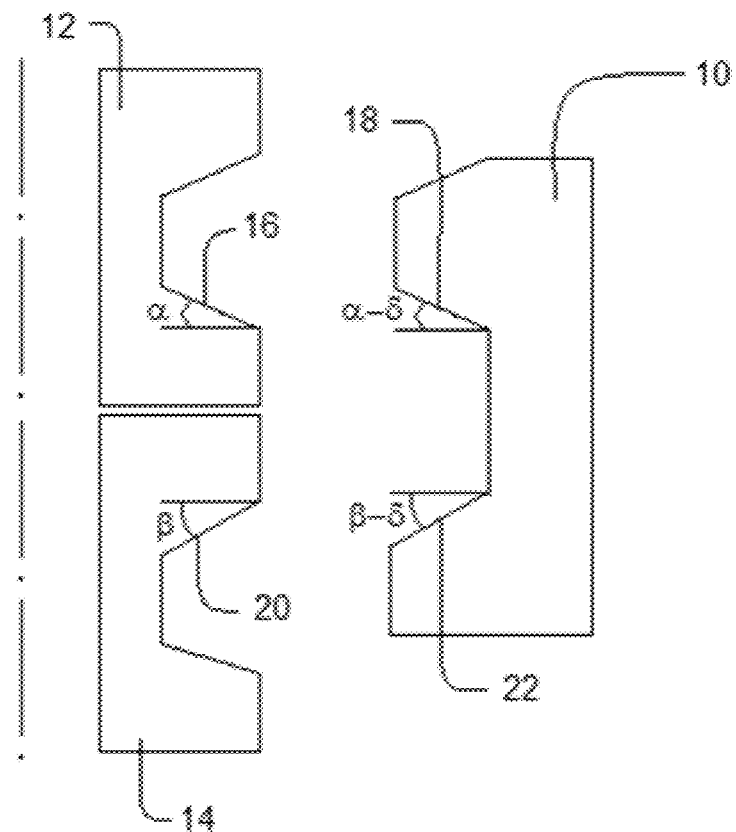
FIG. 1—Schematic concept of the present invention.

FIG. 1 shows schematically a jaw (10) connecting a connection element (12) and a wellhead (14). This jaw (10) comprises teeth (18) and (22) having angles different from the angles of the tooth (16) of the connection element (12) and different from the angle of the tooth (20) of the hub (14). The number of teeth of the jaw varies from one to four but is not limited to that number.

Figure 2:
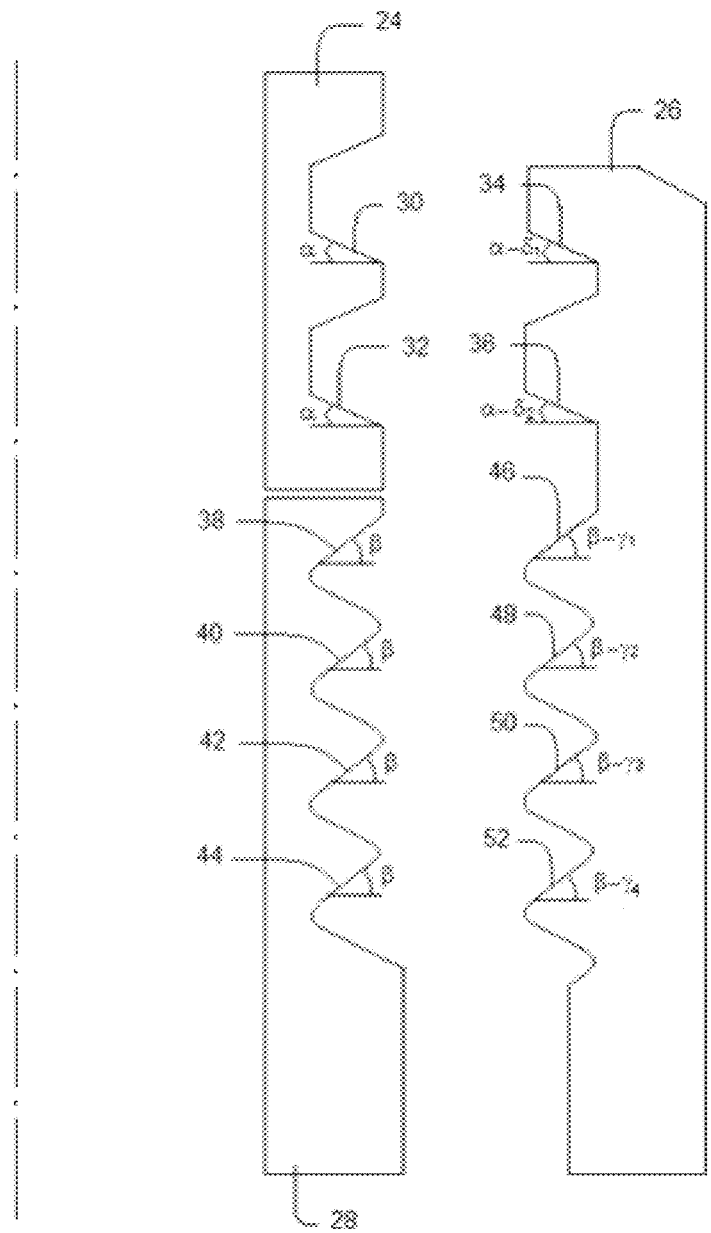
FIG. 2—Schematic drawing of the jaw, wellhead and connection element teeth.

FIG. 2 shows an embodiment of the present invention, this embodiment shows the relation between the angles of the teeth of the jaw (26) and the angles of the teeth of the connection element (24), and between the angles of the teeth of the jaw (26) and the angles of the teeth of the wellhead (28). Given the knowledge from the current art, the angles of the teeth of the connection element (24) and the teeth of the wellhead (28) are standardized by the manufacturers thereof, then, there is no variation of the teeth angles, as well as the distance among the teeth. Therefore, the present invention provides a configuration wherein the teeth of the jaw (26) have differentiated angles and differentiated spacings between them. As can be seen in FIG. 2, the teeth (30) and (32) of the connection element (24) have the same angle α, and the teeth (34) and (36) of the jaw (26) have differentiated angles, as can be seen in FIG. 2, the tooth (34) has an angle α-δ1 and the tooth (36) has an angle α-δ2, wherein δ varies $0° < δ ≤ 1.75°$.

The wellhead (28) comprises teeth (38, 40, 42 and 44) with standardized angles β, in contrast, the teeth (46, 48, 50 and 52) of the jaw (26) have differentiated angulations β having a variation -γ1, -γ2, -γ3 and -γ4, respectively, with γ varying $0° < γ ≤ 1.75°$.

Figure 3:
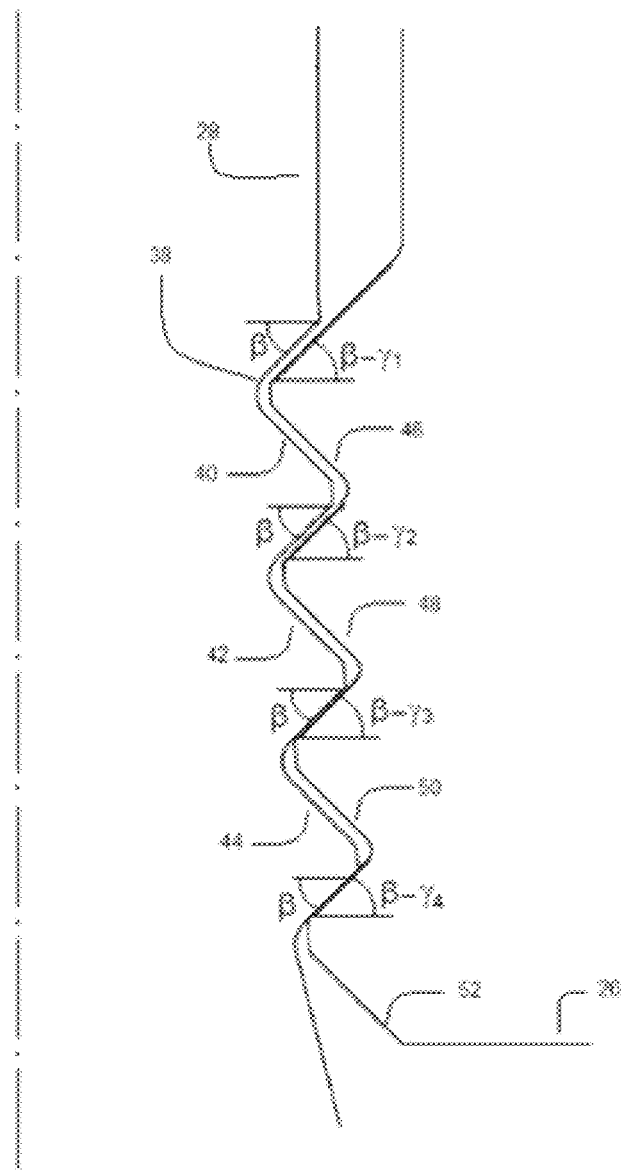
FIG. 3—Schematic drawing of the contact of the jaw teeth with the wellhead teeth.

FIG. 3 shows the relation of the spaces between the teeth of the jaw (26) and the teeth of wellhead (28). An example of what occurs when a tooth of the jaw (26) comes into contact with the tooth of the wellhead (28), in this case, the tooth (52) comes into contact with the tooth (44) at the beginning of the connector preload application. At this time, the other teeth of the jaw (26) are not in contact with the wellhead (28) due to the difference of the angles and to the differentiated spacings abovementioned. Same situation occurs between the teeth of the jaw (26) and the connection element (24).

Figure 4:
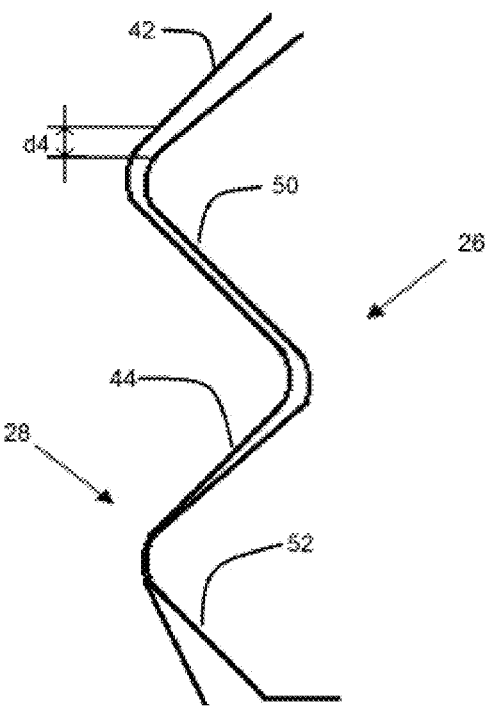
FIG. 4—Spacing detailing between the jaw and wellhead teeth.
Figure 5:
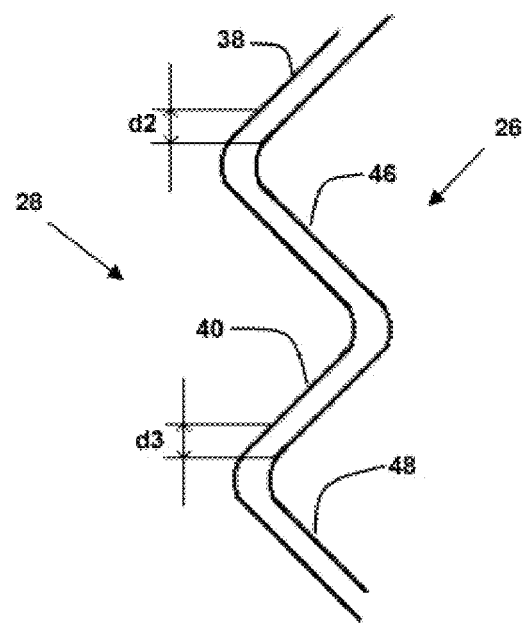
FIG. 5—Spacing detailing between the jaw and wellhead teeth.
Figure 6:
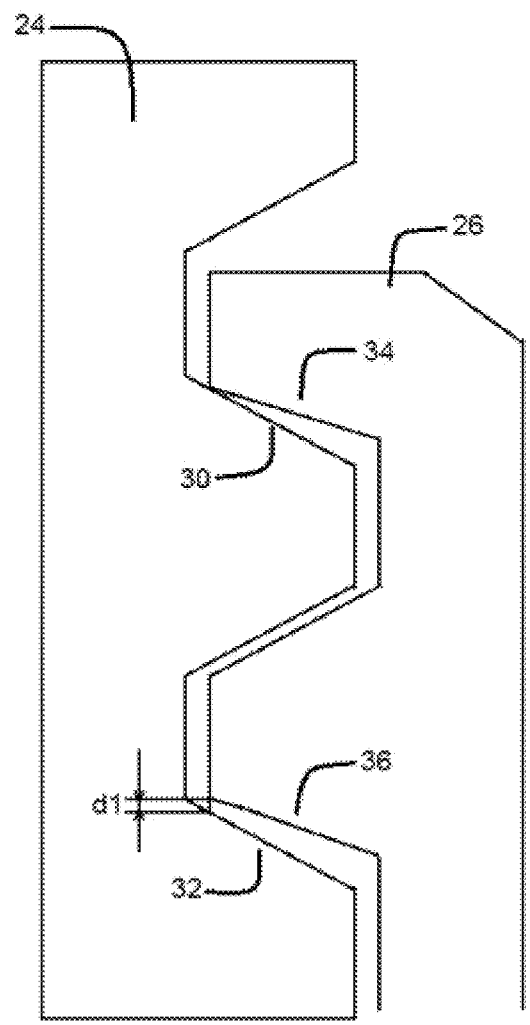
FIG. 6—Spacing detailing between the jaw and connection element teeth.

As can be seen in FIGS. 4 to 6, the spacing d1 is the distance in the axial direction between the tooth (36) of the jaw (26) and the tooth (32) of the connection element (24) when the tooth (52) of the jaw (26) comes into contact with the tooth (44) of the wellhead (28), similarly, spacings (d2, d3 and d4) are the distances in the axial direction between the teeth of the jaw (26) and the teeth of the wellhead (28) when the tooth (52) of the jaw (26) comes into contact with the tooth (44) of the wellhead (28). The distance (d) between the teeth can vary from 0<d≤1.50 mm. The values used depend on the relative stiffness between the different components.

In order to even out the tension distribution along the contact surfaces, the teeth of the jaw (26) are dimensioned to have differentiated angles and differentiated spacings first aiming at a non-uniform coupling. This concept relies on the fact that the tooth of the jaw (26) is in a pre-deforming position, such a way that, when the tooth of the jaw (26) undergoes a compression tension caused by the connector preload application process, the elastic deformation undergone by said tooth, evens out the tension distribution along the contact surface, making the operation more efficient.

The number of teeth of the jaw (26) is defined according to the connector preload. The said jaw (26) preferably comprises from one to four teeth in the coupling region with the wellhead (28), and from one to two teeth in the coupling region with the connection element (24).

Figure 7:
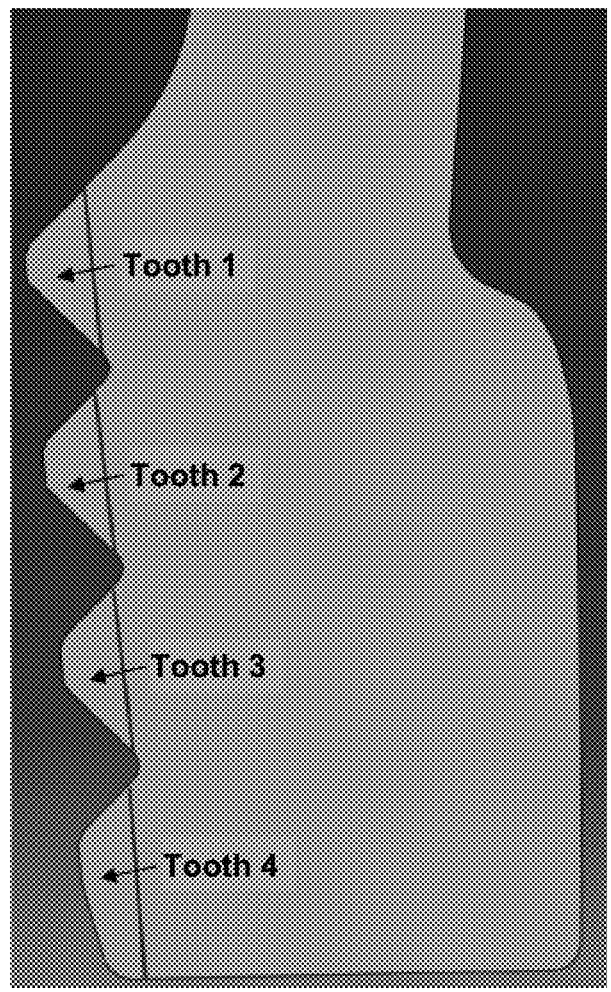
FIG. 7—Schematic drawing of the jaw teeth.

Table 1 below shows the average tension and peak tension values of the connector for the teeth sections shown in FIG. 7 according to the present invention, for the prior art connector (document U.S. Pat. No. 7,614,453) and for a model having a jaw with equal spacing among teeth. Note that the average tension and peak tension values among the teeth of the present invention are smaller when compared with the results of document U.S. Pat. No. 7,614,453 and the model having a jaw with equal spacing.

| Type of tension/Position | Invention | Prior art (U.S. Pat. No. 7,614,453) | Prior art (connector having equal spacing among teeth) |
| --- | --- | --- | --- |
| Average Tension (MPa)-tooth 1 | 433 | 447 | 751 |
| Average Tension (MPa)-tooth 2 | 311 | 381 | 606 |
| Average Tension (MPa)-tooth 3 | 240 | 193 | 159 |
| Average Tension (MPa)-tooth 4 | 172 | 200 | 14 |
| Peak Tension (MPa)-tooth 1 | 274 | 373 | 158 |
| Peak Tension (MPa)-tooth 2 | 344 | 514 | 306 |
| Peak Tension (MPa)-tooth 3 | 163 | 490 | 181 |
| Peak Tension (MPa)-tooth 4 | 160 | 451 | 9 |

As the pressure exerted by the piston increase, the other teeth of the jaw (26) will come into contact with the teeth of the wellhead (28). Such a principle applies to the jaw (26) and the connection element (24).

The invention claimed is:

1. A connector comprising: a jaw having a plurality of teeth formed on an internal profile of the jaw, the plurality of teeth with differentiated angles and differentiated spacing between two axially adjacent teeth of the plurality of teeth formed on the internal profile to connect a connection element and a wellhead, wherein the two axial adjacent teeth are formed in a coupling region with the wellhead or a coupling region with the connection element.

2. The connector according to claim 1, wherein the jaw includes teeth with differentiated angles in relation to teeth of the connection element and teeth of the wellhead, wherein:
   a first tooth of the jaw has an angle $\alpha$-$\delta 1$ and a second tooth of the jaw has an angle $\alpha$-$\delta 2$; and
   a third tooth of the jaw has an angle $\beta$-$\gamma 1$, a fourth tooth of the jaw has an angle $\beta$-$\gamma 2$, a fifth tooth of the jaw has an angle $\beta$-$\gamma 3$, and a sixth tooth of the jaw has an angle $\beta$-$\gamma 4$.

3. The connector according to claim 2, wherein the angles $\delta$ and $\gamma$ are the same or different.

4. The connector according to claim 2, wherein the angle $\delta$ is in a range of $0°<\delta\leq1.75°$ and the angle $\gamma$ is in the range of $0°<\gamma\leq1.75°$.

5. The connector of claim 2, wherein the second tooth is axially adjacent the first tooth, the third tooth is axially adjacent the second tooth, the fourth tooth is axially adjacent the third tooth, the fifth tooth is axially adjacent the fourth tooth, and the sixth tooth is axially adjacent the fifth tooth.

6. The connector according to claim 1, wherein a first spacing between the teeth of the jaw and the teeth of the connection element and a second spacing between the teeth of the jaw and the teeth of the wellhead are in a range of 0<d≤1.5 mm.

7. The connector according to claim 6, wherein the spacing are the same or different.

8. The connector according to claim 1, wherein said jaw has between one and four teeth in the coupling region with the wellhead, and one or two teeth in the coupling region with the connection element.

9. The connector of claim 8, wherein the coupling region with the wellhead of the jaw is axially adjacent the coupling region with the connection element of the jaw.

10. The connector of claim 1, wherein the plurality of teeth with differentiated angles and differentiated spacing between the plurality of teeth are formed on an internal profile of the jaw.

11. The connector of claim 1, wherein the plurality of teeth with differentiated angles and differentiated spacing comprise two axially adjacent teeth formed on a first surface of the jaw in the coupling region with the wellhead and two axially adjacent teeth formed on the first surface of the jaw in the coupling region with the connection element.

* * * * *